US005784699A

United States Patent [19]
McMahon et al.

[11] Patent Number: 5,784,699
[45] Date of Patent: Jul. 21, 1998

[54] DYNAMIC MEMORY ALLOCATION IN A COMPUTER USING A BIT MAP INDEX

[75] Inventors: Douglas James McMahon, Belmont; George Albert Buzsaki, Fremont, both of Calif.

[73] Assignee: Oracle Corporation, Redwood Shores, Calif.

[21] Appl. No.: 653,221

[22] Filed: May 24, 1996

[51] Int. Cl.$^6$ ................................................ G06F 12/02
[52] U.S. Cl. ....................................... 711/171; 711/170
[58] Field of Search ......................... 395/497.01, 497.02, 395/497.03, 497.04, 607

[56] References Cited

U.S. PATENT DOCUMENTS

| | | | |
|---|---|---|---|
| 4,503,501 | 3/1985 | Coylson et al. | 711/129 |
| 4,779,189 | 10/1988 | Legvold et al. | 711/166 |
| 5,109,336 | 4/1992 | Guenther et al. | 711/171 |
| 5,506,986 | 4/1996 | Healy | 707/204 |
| 5,535,368 | 7/1996 | Ho et al. | 711/170 |
| 5,561,786 | 10/1996 | Morse | 711/170 |
| 5,577,243 | 11/1996 | Sherwood et al. | 707/7 |
| 5,581,737 | 12/1996 | Dahlen et al. | 711/170 |

*Primary Examiner*—Tod R. Swann
*Assistant Examiner*—J. Peikari
*Attorney, Agent, or Firm*—Fliesler, Dubb, Meyer & Lovejoy

[57] ABSTRACT

A dynamic memory allocator in a computer assigns portions of memory into a large number of slots that include zero or more memory blocks of equal size. Free lists identify memory blocks, corresponding to a slot size, not currently in use in the computer. Software programs generate requests, including a size, for a memory block. The size of the requests are rounded up to the nearest slot size. To allocate a memory block, the free lists are searched, using a bit map index or a hierarchical bit map index, to identify an available memory block to accommodate the memory block requested. The dynamic memory allocator handles large block allocations different from small block allocations. A virtual memory allocator stores a plurality of pointers to identify one or more virtual pages of memory for allocation to the dynamic memory allocator.

21 Claims, 6 Drawing Sheets

DYNAMIC MEMORY ALLOCATION IN A COMPUTER USING A BIT MAP INDEX

BACKGROUND OF THE INVENTION

1. Field of the Invention:

The present invention is directed toward the field of memory management, and more particularly to techniques to dynamically allocate memory to software programs operating on a computer system.

2. Art Background:

In general, memory management includes dynamic allocation of memory resources to software programs resident in the computer system memory. Dynamic allocation of memory, or dynamic memory, is memory requested by software programs during operation of the software programs. Typically, software programs require low level routines for management of dynamic memory. Dynamic memory allocation is typically required because an application program cannot be preconfigured with memory that fulfills all possible run time requirements of the application. For example, a word processing application program requires memory for each document window currently active on a computer system. The number of document windows, and their sizes, is not known prior to run time of the word processing program. Thus, software programs dynamically request memory to meet run time requirements, and the software program returns the memory when it is no longer used (e.g. when a file or a document window is closed by the user).

In general, dynamic memory management consists of allocating sections of memory, in response to requests from the software programs, and managing free memory blocks. Ideally, the software programs are not required to have knowledge of memory management details. To obtain new memory or free old memory, the software program simply calls abstract interfaces. For example, in the C programming language, the C run time library of many systems includes the functions malloc(size) and free(pointer). The malloc( ) routine returns a pointer to a block of memory that has the requested size, and the free function adds the returned pointer back to the list of free memory.

The simplest implementation of these routines maintains a "free list" of all memory returned by software programs via the free( ) function. When the malloc( ) function is called, the free list is searched to locate a block of memory of the appropriate size. If a memory block of the appropriate size is found, a pointer to the memory block is returned. If a memory block larger than the appropriate size is found, then the block is divided into two smaller blocks; a pointer to the memory block of the requested size is returned to the requesting program, and a pointer to the remainder block remains on the free list. If no block large enough is found on the free list, then a new block is obtained from the operating system.

There are two major shortcomings with this basic free list implementation. First, a search of the free list to locate a block of appropriate size in response to a request for memory is time consuming. Over time memory blocks identified on the free list become disordered, and as a result, the search for appropriate sized memory blocks may require paging inactive memory. Second, over time, the memory blocks become divided into smaller and smaller pieces of memory. As a result, the free list increases to identify many pieces of memory too small to satisfy many requests.

To improve performance of the basic free list implementation, some dynamic memory management systems add enhancements. Typical enhancements to the free list implementation include free block merging, free lists ordered by size, block size rounding, small block processing, and size based free lists.

The free block merging technique attempts to mitigate the fragmentation of memory problem by merging a free block with other fragments that are physically adjacent to the block in memory. Unfortunately, in free block merging, the memory blocks on the free list must remain ordered, thereby reducing the performance of the free operation.

If the free list is ordered by the size of the block, then the search time required to execute the malloc( ) function is reduced. Also, ordering the free list by the size of the block reduces fragmentation because the smallest appropriate size block is always found first. However, this technique transfers the costly search from the malloc( ) function to the free( ) function because each free operation searches the list for the correct location to insert a new block of memory.

The block size rounding technique attempts to reduce fragmentation of memory by rounding all requests up to some minimum size. Although this technique prevents memory from fragmenting into small useless pieces, it does so at the cost of increased memory usage due to the rounding up of small requests.

The small block processing technique takes advantage of the fact that most dynamic memory requests are for small pieces of memory. Thus, a significant increase in speed performance is obtained by maintaining two free lists: a free list of all small blocks, each having the exact same size, and the general large block free list. The small block processing technique virtually eliminates the search time required for small allocations because any small block on the small free list satisfies any small request. The larger the small block size is defined to be, the more memory allocations are accommodated, thereby increasing the speed of more memory allocations. However, because small block memory requests are rounded up to the small block size, the increase speed is at the cost of increased memory usage.

The size based free lists technique uses a separate free list for each of a small number of predetermined block sizes. To maintain a small number of predetermined block sizes, the size based free lists technique selects a few block sizes over the range of memory supported. For example, the size based free lists technique may utilize a power of two selection technique to designate 16 byte, 32 byte, 64 byte, 128 byte, 256 byte, etc., blocks as the predetermined block sizes. All requests for memory are rounded to one of these block sizes. This technique supports fast searching of appropriately sized memory blocks in response to memory requests because any memory block in a given free list is known to satisfy the request. If a free list for the requested block size is empty, then free lists that identify larger blocks require checking to locate a memory block appropriate to divide into the requested block size. However, because of the small number of size based free lists, the division of a large block presents a fragmentation problem. Also, for many typical rounding strategies, division of some memory blocks is difficult because a fixed length header, which must be accounted for in the division of a block, is required for each memory block. Furthermore, the large round-up size between block sizes results in wasted memory (e.g. on an average of 33% wasted memory). Thus, increased speed performance of the size based free list technique is obtained at the cost of increased memory usage.

SUMMARY OF THE INVENTION

A dynamic memory allocator in a computer assigns portions of memory into a large number of slots, such that each slot includes memory blocks of equal size. A plurality of free lists, one for each slot, identify memory blocks, corresponding to the slot size, not currently in use in the computer. Additionally, a bit map index includes bit flags, one bit flag for each free list, to indicate availability of at least one memory block for a corresponding slot. Software programs, operating in a computer, generate requests, including a size, for a memory block. The sizes of the requests are rounded up to the nearest slot size. To allocate a memory block, the free lists are searched utilizing the bit map index to identify an available memory block to accommodate the request. Specifically, the dynamic memory allocator examines the bit map index to identify the smallest available memory block that accommodates the block size requested. After locating an appropriately sized memory block not currently in use, the dynamic memory allocator allocates the memory block to the requesting program.

In one embodiment, the dynamic memory allocator utilizes a hierarchical bit map index to search for available memory blocks. In this embodiment, the dynamic memory allocator assigns each free list or memory block size to one of a plurality of groups. A master bit map index, which contains bit flags that correspond to groups, identifies whether at least one memory block is available in a corresponding group. For each group, a group bit map index, which includes bit flags that correspond to one of the free lists, indicates availability of a memory block in a corresponding free list.

In response to a memory request, the dynamic memory allocator, after rounding up the requested size to the nearest slot size, searches for an available memory block from a free list corresponding to the slot (e.g. using a bit map index). If no memory block of size equal to the slot is available, the dynamic memory allocator searches for an available memory block from a free list corresponding to the next largest slot. The process is continued until either an available block is located or until a free list corresponding to the largest slot has been searched.

In one embodiment, the dynamic memory allocator handles large block allocations different from small block allocations. For small block allocations, a special block of memory is allocated, and the block of memory is used to accommodate requests of size below a predefined threshold if, as identified by the free lists, a memory block is not available and if the special block is large enough to accommodate the request. If the special block is not large enough to accommodate the request, then a new special block is obtained to satisfy the current and future requests, while any remaining portion of the old special block is left unused. A reference count is maintained on each special block to track the disposition of small blocks allocated from the special block, and when all portions of the special block become available for reuse, the entire special block is merged and released for reuse.

For large block allocations, if the smallest available block is still larger than the requested size and is large enough for division into two large blocks, then the dynamic memory allocator divides the block into a first portion, that satisfies the request, and a second portion for use in future requests. The dynamic memory allocator generates, for a divided memory block, a double linked pointer to identify physically adjacent blocks as well as the original contiguous virtual page range from which the large block originated. Through use of the double linked pointers, the adjacent and available memory blocks are merged to generate a new large block. Also, if possible, adjacent and available memory blocks that constitute a contiguous range of virtual pages of memory are merged to restore the pages to the operating system.

DETAILED DESCRIPTION OF THE PREFERRED EMBODIMENTS

The dynamic memory allocation technique of the present invention implements a dynamic memory allocator that uses a large number of size based free lists. In one embodiment, the dynamic memory allocation technique utilizes at least 32 size based free lists to allocate memory. The large number of size based free lists permits the use of a small rounding factor. Also, the dynamic memory allocation technique of the present invention permits easy support of dividing or cutting of memory blocks. In one embodiment, a bit map index is maintained to identify available memory blocks. The bit map index prevents a slow search due to the large number of free lists. As is explained more fully below, the bit index permits searching available or free memory blocks in an extremely small amount of memory. Therefore, paging of inactive memory due to traversing free lists does not occur through use of the dynamic memory allocation technique of the present invention.

In one embodiment, the main parameters include a rounding factor or "bin size" and a maximum memory block size to implement a large number of size based free lists. The rounding factor is defined as the maximum amount of memory a request is rounded to execute a dynamic memory allocation operation. The maximum block size defines the largest block size supported by the size based free lists. A request for a memory block larger than the predefined maximum size results in use of another memory allocation scheme, such as the single free list implementation.

Figure 1:
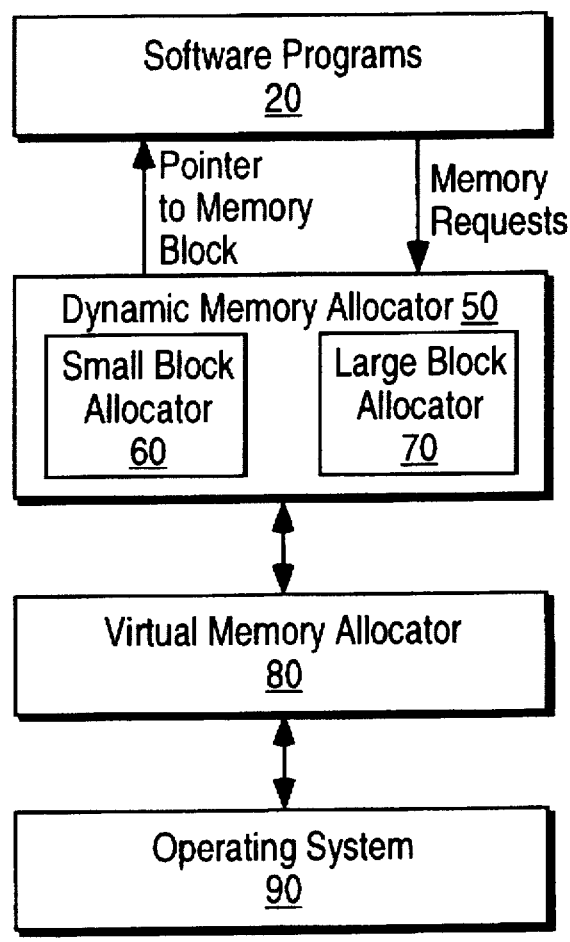
FIG. 1 is block diagram illustrating one embodiment for a software system that incorporates the dynamic memory allocator of the present invention.

FIG. 1 is a block diagram illustrating one embodiment for a software system that incorporates the dynamic memory allocator of the present invention. As shown in FIG. 1, the software system includes one or more software programs, such as application programs, device drivers, etc., labeled software programs 20. A dynamic memory allocator 50, includes, in one embodiment, a small block allocator 60 and a large block allocator 70. In operation, the dynamic memory allocator 50 receives memory requests from software programs 20. A memory request includes a size that specifies the amount of memory required. In response, the dynamic memory allocator 50 returns a pointer to a memory block that fulfills the memory request. Although the dynamic memory allocator 50 is shown including a small block allocator 60 and a large block allocator 70, the dynamic memory allocator 50 may be implemented with a single allocation scheme or multiple allocation schemes as described more fully below.

For the embodiment shown in FIG. 1, the dynamic memory allocator 50 is coupled to a virtual memory allocator 80. In turn, the virtual memory allocator 80 is coupled to an operating system 90, the operating system for the underlying computer. Specifically, the dynamic memory allocator 50 generates requests for virtual pages, and in return, the virtual memory allocator 80 allocates virtual pages that originate from the operating system 90. Thus, for this embodiment, the dynamic memory allocator 50 is an intermediate layer of software that efficiently allocates memory for the software programs 20 from virtual pages received from the virtual memory allocator 80 or the operating system 90.

Figure 2:
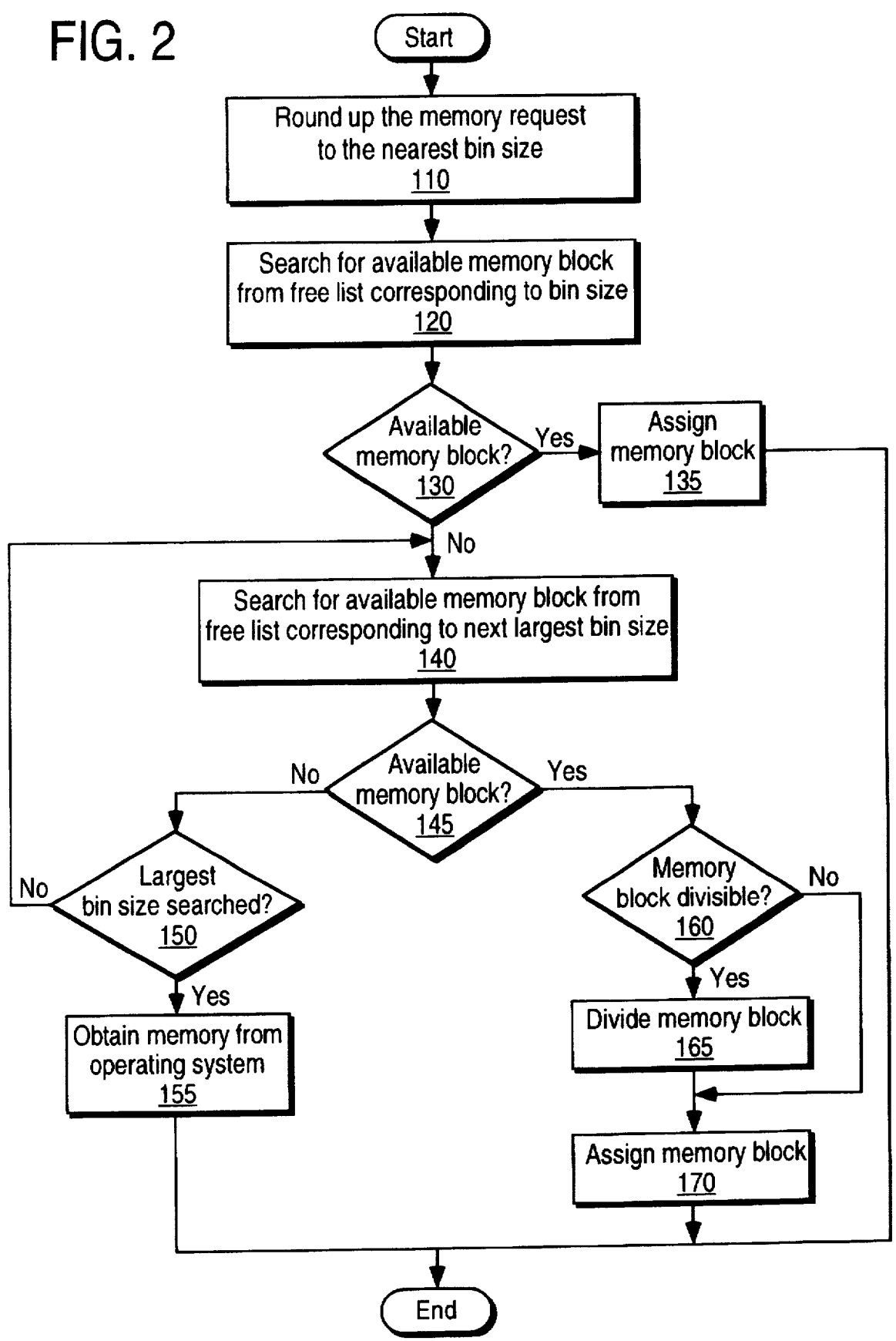
FIG. 2 is a flow diagram illustrating one embodiment for a dynamic memory allocation technique.

FIG. 2 is a flow diagram illustrating one embodiment for a dynamic memory allocation technique. As discussed above, the dynamic memory allocation technique utilizes a large number of size based free lists. In operation, the dynamic memory allocator 50 receives requests from a software program. As shown in block 110, the dynamic memory allocator 50 rounds the memory request size to the nearest bin size in accordance with the predetermined rounding factor. The dynamic memory allocator 50 searches a free list, corresponding to the bin size, for an available memory block as shown in block 120. If a memory block is available for the appropriate bin size, then the dynamic memory allocator 50 assigns a memory block utilizing the pointer on the free list as shown in blocks 130 and 135. As shown in blocks 130 and 140 on FIG. 2, if a memory block is not available in the specified bin, then the dynamic memory allocator 50 searches for an available memory block from a free list that corresponds to the next largest bin size.

Although larger than necessary, a memory block identified on a free list of the next largest bin size fulfills the memory request. If a memory block of the next largest bin size is not available, then the dynamic memory allocator 50 searches for an available memory block from a free list that corresponds to the next largest bin size as shown in block 140. The next largest bin size is defined relative to the last bin sized searched. As shown in blocks 140, 145 and 150, this process is repeated until either an available memory block is found or until the largest bin size has been searched. When an available memory block is found, the dynamic memory allocator 50 determines whether the memory block is divisible as shown in block 160. One embodiment for determining whether a block is divisible is described more fully below. If the memory block is indivisible, then the dynamic memory allocator 50 assigns the available memory block as shown in block 170. Alternatively, if the memory block is divisible, then the dynamic memory allocator 50 divides the memory block and allocates the requested portion as shown in blocks 165 and 170. Also, as shown in blocks 150 and 155, if the dynamic memory allocator 50, after searching the largest bin size, determines that there are no available memory blocks to fulfill the request, then the dynamic memory allocator 50 obtains a virtual page of memory from the virtual memory allocator 80 or the operating system 90. As described more fully below, in one embodiment, the virtual memory allocator 80 obtains memory pages from the operating system. However, a dynamic memory allocator may obtain memory pages from the operating system without deviating from the spirit and scope of the invention.

An example dynamic memory allocator 50 may have a rounding factor of 16 bytes and a maximum block size of 16384. For this example, the dynamic memory allocator 50 includes 1024 free lists. A portion of the free lists for this example is shown in Table 1.

TABLE 1

| Free List | Memory Block |
|---|---|
| 1 | 16 byte blocks |
| 2 | 32 byte blocks |
| 3 | 48 byte blocks |
| . | . |
| . | . |
| . | . |
| 1023 | 16 368 byte blocks |
| 1024 | 16 384 byte blocks |

As shown in Table 1, the dynamic memory allocator 50 maintains free lists that identify available 16 byte blocks, 32 byte blocks, 48 byte blocks, . . . , 16368 byte blocks, and 16384 byte blocks. For a 100 byte block request, the dynamic memory allocator 50 rounds the memory request to 112 bytes based on the 16 byte rounding factor. To search for a 112 byte block, the dynamic memory allocator 50 starts with the seventh free list to search for an available block. If free block is not available on the seventh list, the dynamic memory allocator 50 searches, in succession, larger bin sizes (e.g. eighth free list, ninth free list, tenth free list, etc.). The dynamic memory allocator 50 returns a pointer to an available memory block identified by the first non-empty free list. If necessary, the dynamic memory allocator 50 divides the memory block; a memory block of the requested size is assigned and the remainder of the divided block is referenced by the appropriate free list. If all of the appropriate sized free lists (e.g. free lists that identify blocks greater than 112 bytes) are empty, then the dynamic memory allocator 50 requests a virtual block to extract the 112 byte block.

For the above example dynamic memory allocator, memory requests are rounded to no more than 15 additional bytes. The small rounding size minimizes the amount of memory wasted. Also, the problem of memory block fragmentation is reduced because the smallest possible memory block that satisfies the memory request is used. Furthermore, page traversals (e.g. accessing inactive pages of virtual memory) are eliminated because the first memory block of any nonempty list is assigned.

Free List Searches with Bit Map Indexes:

As discussed above, the dynamic memory allocator 50 potentially searches a large number of free lists to locate an available memory block. For example, the dynamic memory allocator discussed above contains 1024 free lists. For this example, the dynamic memory allocator requires examining up to 1024 free lists to determine memory block availability. In a standard implementation, the dynamic memory allocator, to examine the 1024 free lists, loops up to 1024 times, one for each free list, to check up to 1024 different memory locations. To reduce the time and resources required to search free lists, the dynamic memory allocator 50 utilizes, in one embodiment, a bit map index. In general, the bit map index significantly reduces memory block search time.

Figure 3A:
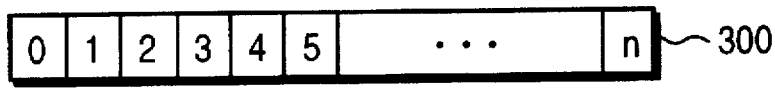
FIG. 3A illustrates a bit map index to indicate the status of a plurality of free lists.

FIG. 3A illustrates a bit map index to indicate the status of a plurality of free lists. For this embodiment, a bit map index 300 includes "n" bit flags, one for each of "n" free lists. The bit flags in the bit map index 300 indicate availability of a memory block in the corresponding free list. Thus, for the example 1024 free lists described above, the bit map index includes 1024 bit flags.

Figure 3B:
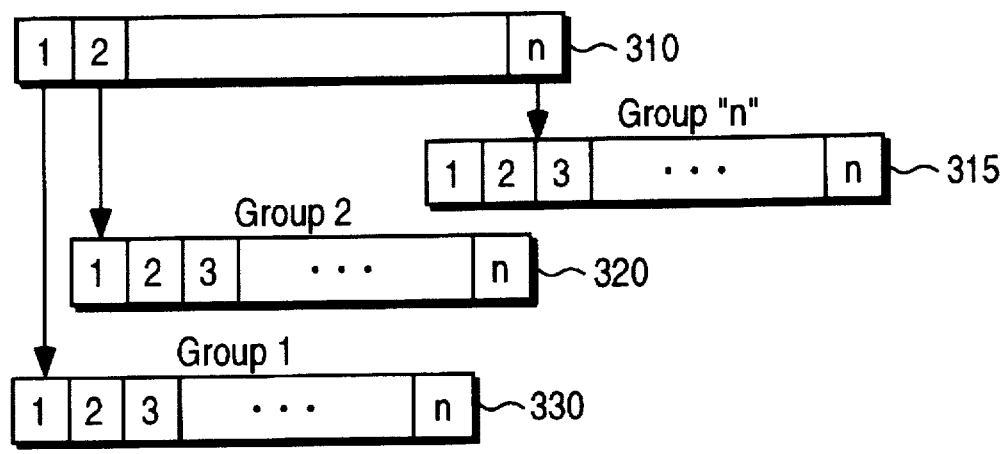
FIG. 3B illustrates a hierarchical bit map index used to search for available memory blocks.

In another embodiment for free list searching, the dynamic memory allocator searches for an appropriately sized available memory block via a hierarchical bit map index. FIG. 3B illustrates a hierarchical bit map index used to search for available memory blocks. The hierarchical bit map index shown in FIG. 3b includes a master bit map index 310, and "n" number of group bit map indexes. For purposes of simplicity, FIG. 3b illustrates a group 1 bit map index 330, a group 2 bit map index 320, and a group "n" bit map index 315. In general, the dynamic memory allocator divides the free lists or memory block sizes into a plurality of groups. For the hierarchical bit map index shown in FIG. 3B, there are "n" groups. The master bit map index, which includes "n" bit flags, one for each group, indicates the status of each group. Specifically, each bit flag indicates whether at least one memory block within the corresponding group is available. In one embodiment, a bit flag set as a "1" or high logic level indicates that the corresponding group contains at least one available memory block.

As shown by the arrows in FIG. 3B, each bit flag in the master bit map index 310 corresponds to a group bit map index. The bit flags in each group bit map index indicate availability of a memory block for a corresponding block size. In one embodiment, a bit flag set as a "1" or high logic level indicates that the corresponding slot contains an available memory block. To determine whether a memory block is available in a particular group, the dynamic memory allocator examines the corresponding bit flag in the master bit map index. In one embodiment, the dynamic memory allocator is implemented in a computer system with a 32 bit hardware architecture, and each bit map index, including the master and group bit map indexes, includes 32 bit flags. Thus, to search for memory block availability, bit flags in the 32 bit machine word are examined simultaneously. If the bit flag for the desired group is set, the dynamic memory allocator evaluates the appropriate bit flag in the group bit map index to ascertain availability of a specific memory block within that group.

Figure 3C:
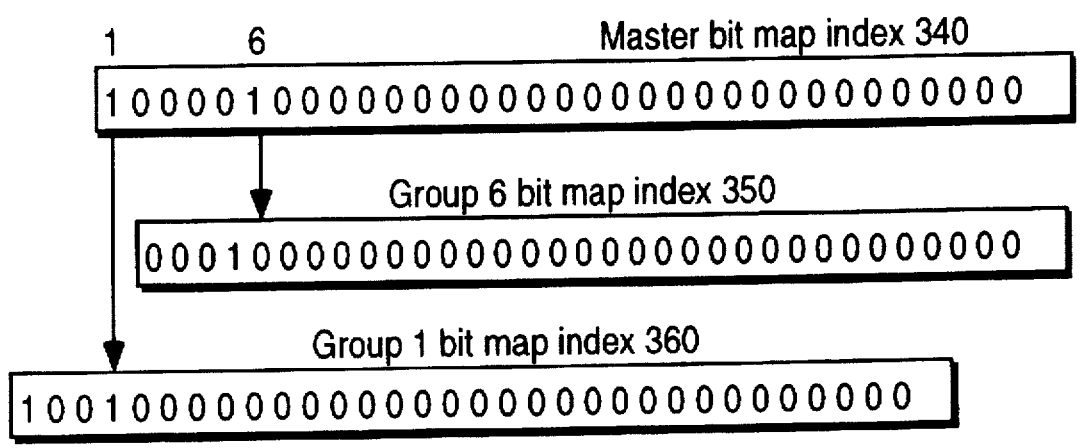
FIG. 3C illustrates an example hierarchical bit map index for a dynamic memory allocation scheme.

FIG. 3C illustrates an example hierarchical bit map index for a dynamic memory allocation scheme. The example shown in FIG. 3C corresponds to the example dynamic memory allocation system that contains 1024 free lists. The bit map indexes shown in FIG. 3C (340, 350, and 360) are configured as 32 bit words for a 32 bit computer architecture. The hierarchical bit map index includes, in part, a master bit map index 340, a group 6 bit map index 350, and a group 1 bit map index 360. As shown in the master bit map index 340, bit flags "1" and "6" are set, thereby indicating at least one memory block is available in both group 6 and group 1.

For a 112 byte block request, the dynamic memory allocator computes that the free list 7, which indicates the status of 112 byte memory blocks, is part of group 1. The master bit map index indicates that free lists 1 and 4 contain at least one available memory block. The dynamic memory allocator 50 checks the master bit map index to ascertain that group 1 contains some non-empty free lists (i.e. at least one memory block is available). Then, the dynamic memory allocator, utilizing the group 1 bit map index 360, masks off the lower bit flags, corresponding to free lists 1–6, to search for a memory block greater than or equal to a 112 byte block. Because bit flags 7–32 are all set to "0", which indicates that there are no available memory blocks in free lists 7–32, the dynamic memory allocator returns to the master bit map index 340. From the master bit map index 340, the dynamic memory allocator determines that the next appropriate non-empty group of free lists is group 6. Because group 6 includes free lists that identify memory blocks larger than the required 112 byte memory block, the dynamic memory allocator searches for a memory block from the smallest non-empty free list.

Based on the group 6 bit map index 350, the dynamic memory allocator identifies an available 2624 byte block. Thus, as illustrated by the above example, the dynamic memory allocator requires examination of only three memory locations to identify the smallest usable memory block.

For the memory allocation system that contains 1024 free lists, the hierarchical bit map index reduces the search time by a factor of at least 32. For the 32 bit computer system implementation, the dynamic memory allocator checks the status of 32 lists at one time by comparing the entire bit map index stored as a machine word. Thus, in the above example, 32 bit map indexes, each consisting of 32 bit flags, holds the status of all 1024 free lists. For an allocation system containing 1024 free lists, no more than 32 loops of execution in a computer are ever necessary for a particular search.

Dynamic Memory Allocation Embodiments:

In one embodiment, the dynamic memory allocator implements, in addition to the large number of size based free lists, small block processing. In general, small block processing operates on the notion that most dynamic memory requests are for small blocks of memory. Based on this, a significant enhancement in allocation is obtained by handling small block requests differently from large block requests. In one embodiment for small block processing, a free list of small blocks, each the exact same size, and the general large block lists are maintained. The small block processing scheme virtually eliminates the search time for small allocations because any block on the small block free list satisfies any small block request. A large block size for the small block permits efficient execution of more memory requests. However, due to the potentially large roundups for small block requests, a large block size implementation for the small block results in increased memory usage. Another embodiment for small block processing, which handles requests for small blocks differently from requests for large blocks, is described more fully below.

In another embodiment for dynamic memory allocation, the dynamic memory allocator, in addition to implementing a form of small block processing and a large number of fixed size free lists, implements free block merging. In free block merging, the dynamic memory allocator attempts to mitigate the memory fragmentation problem (i.e. a large number of unusable blocks) by merging a free block with other fragments physically adjacent to the free block. One embodiment that implements a form of free block merging, for both large allocations and small allocations, is described more fully below.

Small Memory Block Allocation:

Since most software programs use large numbers of small memory blocks, the dynamic memory allocator distinguishes between small block requests and large block requests. In one embodiment, small block requests include memory requests for less than 256 bytes. The request for small blocks is handled by the small block allocator 60 in the dynamic memory allocator 50 (FIG. 1). In the small block allocator 60, the range of small block memory sizes is divided into subranges or slots. In the small block allocator 60, requests are executed to optimize the speed performance of small blocks, even at the possible loss of memory usage performance. In one embodiment, merging of free small blocks is not performed. However, all small memory block requests are rounded up to the nearest slot size, and therefore all small memory blocks correspond to one of the slot sizes. The discrete partitioning of memory blocks into the slots increases the likelihood that a small block of memory is reused (i.e. the predetermined slot sizes eliminates a collection of odd size memory blocks). In one embodiment, the number of slots defined is small to avoid having memory blocks assigned to free lists that are not quite large enough for reuse. As is described below, the small block allocator 60 includes a "special" block of memory that is divided into small memory blocks.

Figure 4:
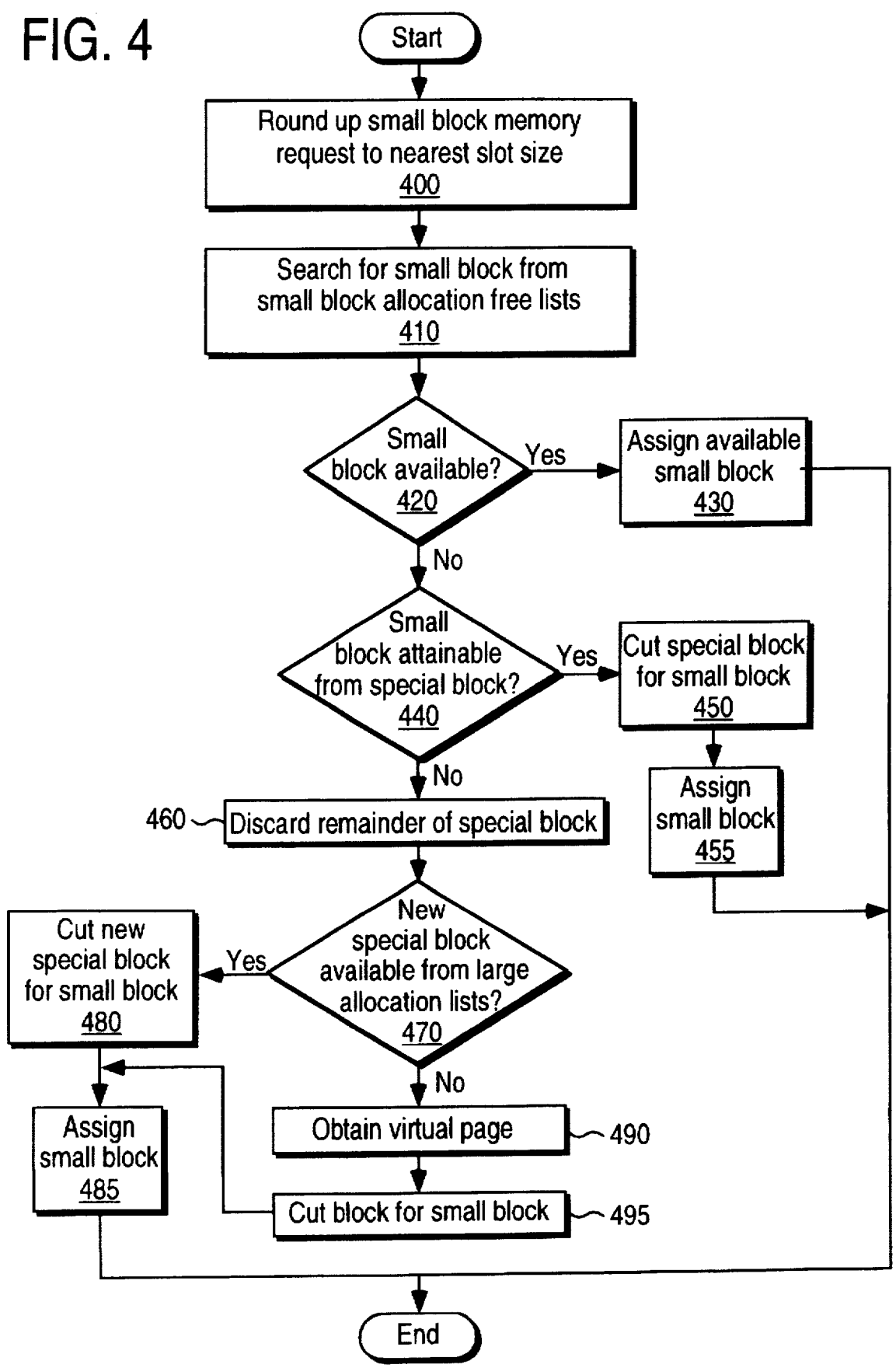
FIG. 4 is a flow diagram illustrating the allocation of small blocks in accordance with one embodiment of the present invention.

FIG. 4 is a flow diagram illustrating the allocation of small memory blocks in accordance with one embodiment of the present invention. The small block allocator receives small block requests, and in response, it rounds up small block memory requests to the nearest slot size as shown in block 400. Based on the nearest slot size, the small block allocator searches for small blocks from small block free lists as shown in block 410. If a memory block that corresponds to the slot size is available, then the small block allocator assigns the available small block to the requesting program as shown in blocks 420 and 430. If a memory block of the appropriate slot size is not available, then the small block allocator determines whether the small block may be cut from the special block as shown in blocks 420 and 440. If the small block may be cut from the special block, then the small block allocator divides the block to extract the requested small block, and it assigns the small block memory extracted to the requester as shown in blocks 450 and 455. Alternatively, if the small block cannot be cut from the special block, then the remainder is left unused, and a new special block, as identified by the large block lists, is sought as shown in blocks 460 and 470.

If a new special block of memory is available from the large block lists, and if the small block may be cut from the new special block, then the small block allocator cuts the appropriate sized small memory block from the new special block, and it assigns the small memory block to the requester as shown in blocks 480 and 485. Alternatively, if a new special block is not available from the large block allocation lists, then the small block allocator obtains a virtual page from the operating system or a virtual block allocator as shown in blocks 470 and 490. From the virtual page, the small block allocator cuts the appropriately sized small memory block for assignment to the requester as shown in blocks 495 and 485.

As discussed above in conjunction with the flow chart of FIG. 4, if a small block request cannot be extracted from the special block, the memory remaining in the special block is left unused, and a new special block is obtained. In one embodiment, to obtain a new special block, the small block allocator indicates a size range and an optimal value, wherein the size range is expressed as a minimum and maximum value, and the optimal value is expressed as an optimal size. To obtain the new special block, the small block allocator searches the free lists for large block allocation beginning with the free list that corresponds to the minimum value expressed. If necessary, free lists that identify larger memory blocks are examined. Only one test is performed on each large block allocation free list. The first large memory block available is used. Based on this algorithm, any memory block found is larger than the minimum size. Thus, all of the large block free lists are not searched to locate an appropriately sized special block because the search stops at the first non-empty free list. If the available memory block located is larger than the maximum size, then the memory block is divided to the optimal size.

Figure 5A:
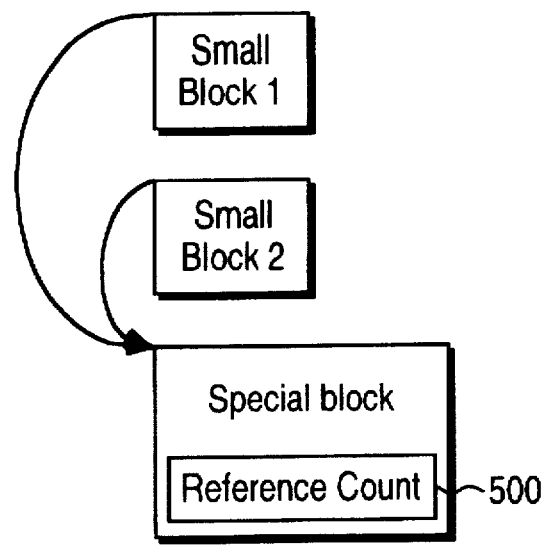
FIG. 5A illustrates a plurality of small blocks with linkages to a special block of memory from which the small blocks originated.

Small memory blocks, which originate from a large block of memory, may be combined to the original large block of memory. In general, the releasing or "freeing" of a small memory block involves inserting the pointer of the small memory block at the head of the appropriate small block allocation free list. In one embodiment, linkage pointers, which require costly maintenance in both memory and in speed, are not used to merge small blocks into large blocks of memory. Instead, each small memory block maintains a pointer that identifies the large block from which the small block originated. In addition to the link to the special block, each small block is linked to the free lists through the pointers that identify the individual small blocks. FIG. 5A illustrates a plurality of small blocks with linkages to the block of memory from which the small blocks originated.

Within each special block of memory, a reference count scheme is utilized to track the total number of small memory blocks apportioned from that block. Specifically, whenever a small memory block is allocated from the special block of memory, a reference count, shown as a reference count field 500 in FIG. 5a, is incremented. Conversely, whenever a small memory block is released (i.e. the small block is relinquished by the software program), the reference count is decremented. Whenever the release of a small memory block reduces the reference count for the corresponding special block of memory to zero, then all of the small memory blocks derived from the large block of memory are resident on the various small block allocation free lists. Accordingly, the entire special block of memory may be returned or released to the large memory block allocation free list from which the block of memory originated.

To free or release a special block of memory used in small block allocation, the pointers to the individual small memory blocks that form the block of memory are removed from the various small memory block allocation free lists. The process of removing pointers of the small memory blocks from the free lists requires no searching of the free lists because the pointers to the individual small memory blocks are linked to both the free lists and the corresponding special block. In one embodiment, the process of removing pointers involves "traversing" the small blocks of the special block of memory sequentially and removing each pointer in turn. After the pointers are removed from the free lists, the special block of memory is released to the large memory block allocation free lists.

Large Memory Block Allocation:

The large block allocator 70 (FIG. 1) is utilized to allocate memory in response to requests for large memory blocks. In one embodiment, large memory blocks are defined as memory blocks larger than 256 bytes. The large block allocator 70 divides memory in the large memory block range into a large number of slots or bin sizes. Each memory block in a slot size has precisely the same size. In one embodiment, memory for large blocks are divided into 64 byte increments (e.g. each slot in the large memory block range is separated by 64 bytes). Thus, for the 64 byte increment implementation, there are slot sizes of 256, 320, etc., up through a final slot that includes the largest block available from the dynamic memory allocator. Requests for large memory blocks are rounded to the nearest slot size. For example, a 390 byte request is rounded to 448 bytes for the 448 byte slot. In one embodiment, the large block allocator 70 generally operates in accordance with the method shown in the flow diagram of FIG. 2.

As discussed above in conjunction with the flow chart of FIG. 2, if a memory block located in response to a request for memory is larger than the requested size, the dynamic memory allocator determines whether the memory block located is divisible (see block 160 FIG. 2). If the memory block located is divisible to accommodate the requested memory size, then the block is divided (block 165, FIG. 2). In one embodiment for large block allocation, a large memory block is not cut into a large memory block and a small memory block; instead, the large memory block is only cut into two large memory blocks (e.g. memory blocks larger than 256 bytes).

Figure 5B:
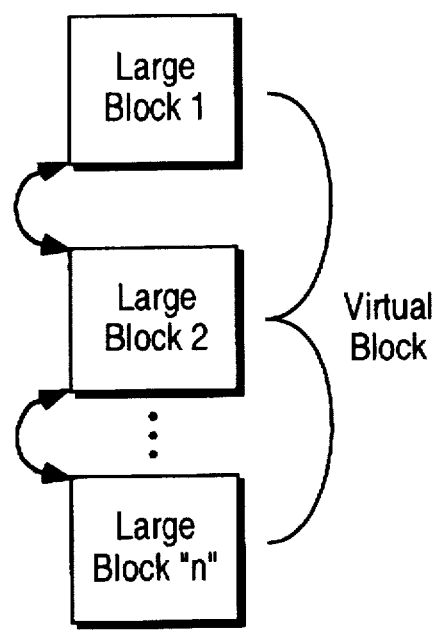
FIG. 5B illustrates double linked pointers or linkages used in large block allocation.

Whenever a large memory block is divided, double linked pointers or linkages are maintained. FIG. 5B illustrates double linked pointers or linkages used in large block allocation. In general, the double linked linkages facilitate merging of the large memory block when the individual memory blocks are free. The linkages are completely independent of the free list pointers in that free list pointers link blocks regardless of whether they are physically adjacent. In one embodiment, eight bytes of overhead on the memory block are required to maintain the linkages. In general, the linkages maintain a connection between physically adjacent blocks by storing, in the eight byte field, a first pointer to the memory block located physically adjacent in a higher memory location (e.g. the adjacent memory block above) and a second pointer to a memory block located physically adjacent in a lower memory location (e.g. the adjacent memory block below).

The dynamic memory allocator 50 optimizes the freeing of large blocks of memory. As discussed above, both free large memory blocks and large memory blocks in use are tracked on a double linked list (e.g. double linked pointers). To free a large block of memory, adjacent blocks, marked as free memory blocks, are merged together, if possible, through use of the double linked list. When large memory blocks are merged, the memory blocks are removed from their respective free lists, and the combined memory block is placed on a free list that corresponds to the size of the new memory block. Furthermore, if the process of merging large memory blocks results in generating a contiguous virtual memory block, then the new virtual memory block is released back to the virtual memory allocator 80 or the operating system 90.

Virtual Block Allocation:

As discussed above, both the small block allocator 60 and the large block allocator 70 generate requests, when necessary, for a new range of virtual pages. Specifically, in one embodiment, whenever the dynamic memory allocator 50 requires more virtual pages, it calls the virtual memory (VM) allocator 80. In response to a request for virtual pages, the virtual memory allocator 80 rounds the virtual memory requests to an even number of operating system virtual pages. In addition, the virtual memory allocator 80 rounds up the virtual memory request to a minimum size in an attempt to reduce the overhead of executing these operating system requests. In one embodiment, the minimum size for virtual memory requests is large enough such that the requested memory block may be placed on the free list of the largest possible slot in the large block memory block allocator.

The virtual memory allocator 80 maintains an internal list of virtual blocks previously released by the dynamic memory allocator. From the list of virtual blocks, the virtual memory allocator 80 attempts to satisfy all virtual memory requests before executing an operating system call for a new virtual block of memory. In one embodiment, the virtual memory allocator 80 allocates memory from the internal list on a first fit basis such that any virtual block that fulfills the request is allocated. The virtual blocks are returned intact such that they are not cut or divided by the virtual memory allocator 80. Since most requests for virtual pages are rounded to the minimum block size, blocks identified on the internal lists are typically allocated.

The free list in the virtual memory allocator 80 is maintained to support UNIX limitations and to prevent thrashing. For UNIX operating system implementations, only pages at the top of the memory heap (e.g. pages at the break (sbrk) boundary may be released). Thus, the free list in the virtual memory allocator 80 is utilized to track blocks that cannot be immediately released to the operating system because of the break boundary limitation. In general, thrashing occurs when memory is repeatedly allocated and released to the operating system while the various free lists on the dynamic memory allocator are near empty. Thus, the free lists in the virtual memory allocator 80 prevent the thrashing of a large virtual block of memory back and forth to the operating system 90.

When virtual blocks are released to the virtual memory allocator 80, the blocks are referenced by the virtual memory allocator free list (e.g. pointers are placed on the free list). As discussed above, virtual memory blocks are removed from the virtual memory allocator free list, and the virtual blocks are returned to the operating system when certain operating system dependent conditions are met. For example, in UNIX, the virtual block must be located at the memory break prior to release to the operating system.

For implementations on both VMS and UNIX, the virtual block is maintained on the virtual memory allocator free list at all times to avoid the thrashing problem. However, there are two exceptions to maintaining the virtual blocks on the virtual memory allocator free list. First, if the virtual block is larger than the minimum size for the virtual memory allocator, then the virtual memory allocator immediately frees this virtual block in an attempt to eliminate oversized virtual blocks. This operation does not present a thrashing problem because at most one more virtual memory allocation of the minimum size results. Furthermore, it is anticipated that no software program cycles an oversize request through the "malloc" and "free" functions. The second exception results when no other virtual blocks are in use. If this occurs, the virtual memory allocator releases to the operating system all of the virtual blocks on the virtual memory allocator free list. Typically, a software program releases or frees all of its memory during a shut down or exit operation, and therefore, under these conditions, the thrashing problem does not occur.

C Programming Interface Routines:

The malloc( ) function is a routine that returns a pointer to memory in response to a request for a specific size of memory. The dynamic memory allocator further includes implementation of a realloc function. The realloc function is tuned for speed. In one embodiment, small blocks of memory are not contracted or divided in response to a realloc( ) function call due to the overhead required to downsize a small memory block. Furthermore, the small memory blocks are rounded up prior to allocation, thereby further reducing the need to divide or cut small memory blocks. If a small block is expanded beyond the blocks rounded up size in response to a realloc( ) function call, then the dynamic memory allocator allocates a new block and frees the original small memory block. This operation includes transferring data from the original small memory block to the new memory block. If a large block of memory is downsized or cut, the dynamic memory allocator attempts to divide the large memory block with the removed portion returned to the appropriate free list. If the large memory block cannot be cut, no action is executed. If a large memory block is expanded in response to the realloc( ) function call, the dynamic memory allocator attempts to merge the large memory block with a physically contiguous block. If successful, the expand operation on the large memory block does not require data transfer. However, if an adjacent block is not available, then a new large block is allocated, and the old memory block is released. For the latter case, data is transferred from the original large block to the new large block.

The dynamic memory allocator also implements the calloc( ) function. To execute the calloc( ) function, the malloc( ) function is executed to retrieve a memory block of the appropriate size. This memory block is then initialized to all zeros. The dynamic memory allocator further implements the valloc( ) function. The valloc( ) function returns page aligned memory blocks. In response to a valloc( ) call, the dynamic memory allocator increases the size of a request by the size of a page, and it utilizes the malloc( ) function to obtain a memory block. The amount of padding required to align a memory block is computed, and the padding amount is added to the address returned by the malloc( ) function. The word immediately proceeding a memory block allocated with the valloc( ) function is marked with the size of the amount of padding. In addition, a bit flag in the word is set to indicate that the memory block is a valloc block (e.g. the bit flag located at the second least significant bit position is set).

The free( ) routine detects the state of the bit flag, and it rolls back the padding introduced by the valloc( ) function to reveal the true memory block for the free operation. The realloc( ) function also detects the state of the bit flag to insure that a properly align pointer is returned. The use of the second bit as a valloc tag is permissible because the rounding of memory block sizes to the eight byte minimum boundaries guarantees that the three lowest ordered bits are always available. For the free( ) function, a null pointer is returned without error. When a null pointer is passed in the realloc( ) function, the dynamic memory allocator executes a straight malloc( ) function. Also, if a software program requests 0 bytes in a malloc( ) or realloc( ) function calls, the dynamic memory allocator returns a pointer to a minimum size small memory block. A software program may request a realloc( ) on the most recently released block if no other operation has been executed in the interim. In one implementation, this operation is supported in a dynamic memory allocator if a symbol is reconfigured. However, this operation is not preferred because it reduces speed, due to the extra check, and it also prevents the releasing of a virtual block to the operating system.

Internal Data Structures:

In one embodiment, a 16 byte data structure is reserved at the end of each contiguous virtual block. The 16 byte data structure is used to maintain a list of blocks in use. Read operations to memory in computers are sometimes executed in four byte words (e.g. string operations). If the memory ended near a page boundary, and if the page was not previously word aligned, then the processor may generate a memory fault. Thus, these string operations require from zero to three bytes of padding at the end of a virtual memory page boundary to prevent generation of a memory fault. Because of this, the 16 byte structure is inserted at the end of the virtual block. When virtual blocks are on the free list (e.g. the virtual blocks are not is use), a different structure, located at the head of the virtual block, is used to maintain the length list. Both forms of lists are double linked lists to facilitate the merge and free operations. The free list is ordered from top to bottom to fulfill requirements of some operating systems, such as UNIX, to properly return a virtual block to the operating system.

In one embodiment, the 16 byte structure on a large memory block contains linkages to adjacent blocks, if any, a pointer to the slot that corresponds to the large memory block, and the size of the large memory block. For this embodiment, the size is stored in the word position closest to the data area of the large block to maintain compatibility with small memory blocks. The remaining portion of the large memory block is used for data storage, while in use, and it is always a size multiple of 16 bytes. If the large block is not used (i.e. the block is free), then the first two words of the data area are used to store the lengths of the large memory block on the appropriate free list.

A small block is headed by a four byte structure that contains the size of the block, and a pointer to the block of memory from which the small block was allocated. The dynamic memory allocator utilizes the fact that the pointer to the block of memory is aligned on a 16 byte boundary. The dynamic memory allocator uses the Low order four bits to code the size of the small block. Therefore, for a small memory block, only four bytes are stored in the header to support merging and freeing of small blocks. The pointer to the source block of memory is used to implement the reference count scheme described above. The coding of the low order four bits for a small block are set for compatibility with large blocks. Table 2 includes one coding scheme to code bits 0–3 for a small block.

TABLE 2

| Bit Code | Translation |
| --- | --- |
| 0 | 12 byte block |
| 1 | 28 byte block |
| 2 | 60 byte block |
| 3 | 124 byte block |
| 4 | 252 byte block |
| 6 | VALLOC block flag |
| 7 | LARGE block flag |

If the small memory block is not in use, then the first two words of the data area are used to store link lists of the memory block on the appropriate free lists. Because the headers are four bytes, the 16 byte alignment of the data area is not guaranteed unless each of the small slot sizes or bin sizes is four bytes less than a multiple of 16 bytes (e.g. 12, 28, 60, etc.). The special block of memory, used to generate the small memory blocks, includes a 28 byte header. The 28 byte header ensures that the first small memory block appropriated from the special block begins on a 16 byte boundary. A block of memory, large or small, includes a size word located immediately proceeding the data area. Thus, by inspecting the size word in the known location, the proper determination as to the size of the block header (e.g. large or small) is easily ascertained. Furthermore, the low order bit of the size word is utilized as a flag to tag the status of a block. For example, if the bit is set, then the block of memory is in use. This scheme works because all requests are rounded up.

In one embodiment, the dynamic memory allocator supports special operational modes. The modes are toggled through special control functions. Once set, the operating modes remain constant to ensure proper operation. In a first operational mode, one bit flag is utilized to collect statistics on byte and block counts for used and free memory. A second mode writes random bit patterns into freed memory blocks in an attempt to catch overruns and misuse of freed memory. A third mode performs an exhaustive check of heap integrity before every operation. A fourth mode tags allocated memory blocks with the file and line number where the memory block was allocated to enable tracking of memory usage and/or detection of memory leaks.

Figure 6:
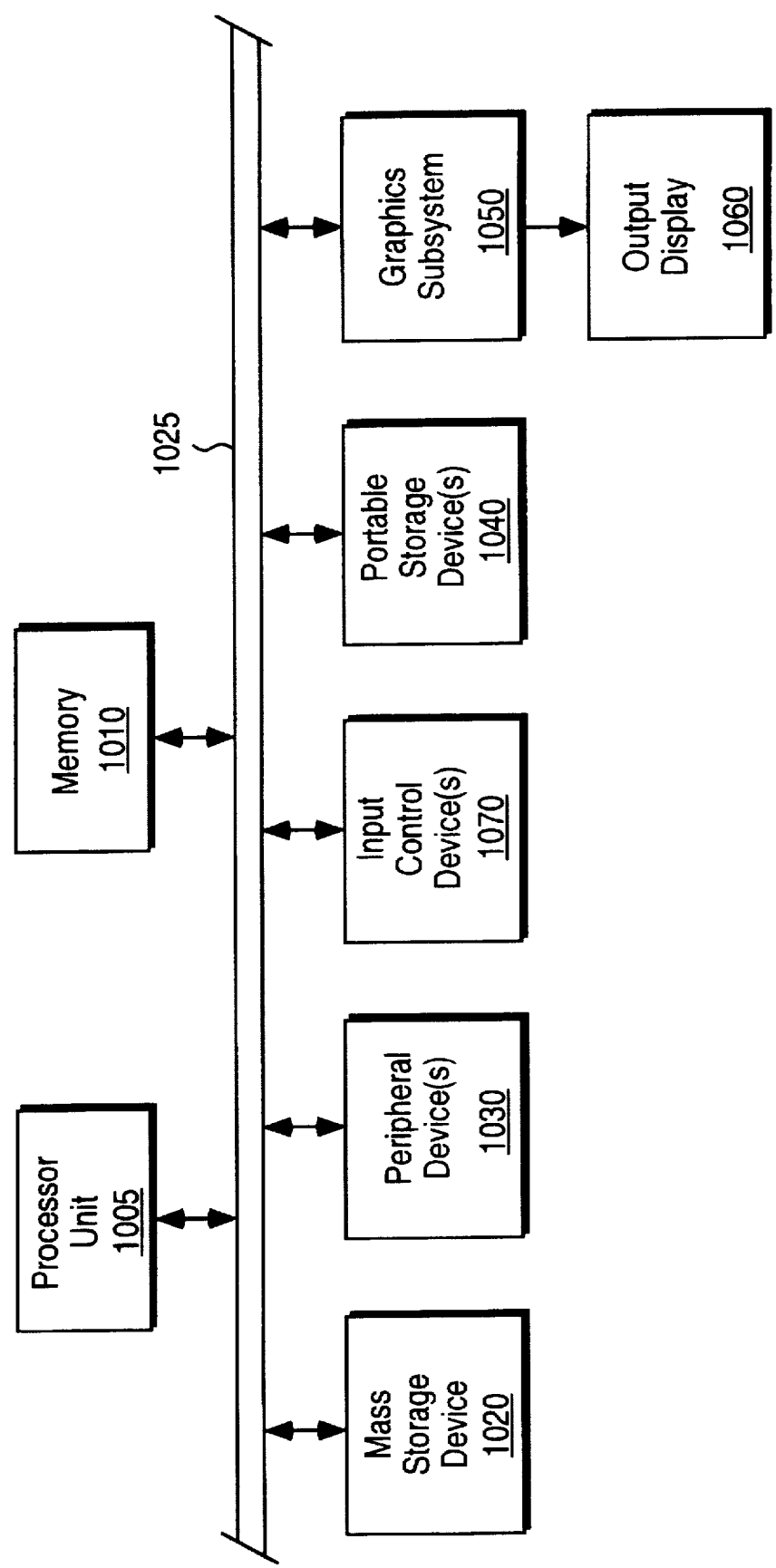
FIG. 6 illustrates a high level block diagram of a general purpose computer system in which the dynamic memory allocation system of the present invention may be implemented.

Computer System:

FIG. 6 illustrates a high level block diagram of a general purpose computer system in which the dynamic memory allocation system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the dynamic memory allocator of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 6 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the dynamic memory allocation system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the dynamic memory allocation software is stored on such a portable medium, and it is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the dynamic memory allocation system software may be input to the computer system 1000 via a portable storage medium or a network for execution by the computer system 1000.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and it processes the information for output to the output display 1060. The components contained in the computer system 1000 are those typically found in general purpose computer systems, and in fact, these components are intended to represent a broad category of such computer components that are well known in the art.

The dynamic memory allocation system may be implemented in either hardware or software. For the software implementation, the dynamic memory allocation system is software that includes a plurality of computer executable instructions for implementation on a general purpose computer system. Prior to loading into a general purpose computer system, the dynamic memory allocation system software may reside as encoded information on a computer readable medium, such as a magnetic floppy disk, magnetic tape, and compact disc read only memory (CD-ROM). In one hardware implementation, circuits may be developed to perform the functions described herein.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for allocating memory in a computer system, said method comprising the steps of:

assigning portions of memory of equal size into one of a plurality of slots such that each slot includes zero or more memory blocks of equal size;

generating a bit map index comprising a plurality of bit flags, wherein each bit flag corresponds to one of said slots and indicates availability of at least one memory block for a corresponding slot;

receiving a request, including a size, for a memory block;

searching for available memory in response to said request by examining one or more of said bit flags in said bit map index to identify an available memory block to accommodate said memory block request; and assigning a memory block not in use to accommodate said memory block request.

2. The method as set forth in claim 1, wherein:

the step of generating a bit map index comprises the step of generating a hierarchical bit map index including the steps of:

assigning said slots to a plurality of groups;

generating, for each group, a group bit map index comprising a plurality of bit flags, wherein each bit flag corresponds to one of said groups, and each bit flag indicates availability of at least one memory block in a corresponding group;

generating, for each slot, a slot bit map index comprising a plurality of bit flags, wherein each bit flag corresponds to one of said slots, and each bit flag indicates availability of at least one memory block in a corresponding slot;

the step of searching by examining one or more of said bit flags comprises the steps of:

examining said group bit index to identify an available group of memory blocks that accommodate said memory block requested; and examining one or more slot bit map indexes based on said bit flags in said group bit index to identify an available memory block to accommodate said memory block requested.

3. The method as set forth in claim 1, wherein the step of searching for available memory in response to said request comprises the steps of:

searching for an available memory block corresponding to said nearest slot rounded up for said memory block requested;

searching, if no memory block of size equal to said nearest slot rounded up for said memory block requested is available, for an available memory block corresponding to a next largest slot; and searching, if no memory block in a prior slot searched is available, for an available memory block from a slot corresponding to a next largest slot until either an available block is located or until a largest slot has been searched.

4. The method as set forth in claim 1, wherein the step of assigning portions of memory of equal size into one of a plurality of slots comprises the steps of:

assigning said memory into a plurality of slots, in increments of a first size, for small block allocations, wherein small block allocations include allocations of memory blocks smaller than a predefined maximum small block size; and assigning said memory into a plurality of slots, in increments of a second size, for large block allocations, wherein large block allocations include allocations of memory blocks smaller than a predefined maximum large block size and greater than said predefined maximum small block size.

5. The method as set forth in claim 1, further comprising the steps of:

referencing a special block; and apportioning said special block into a memory block of a size to accommodate said memory block requested if, as identified by said bit map index, a memory block is not available and if said special block is large enough to accommodate said memory block requested.

6. The method as set forth in claim 5, further comprising the steps of:

discarding, as a reference, said special block if said special block is not large enough to accommodate said memory block requested;

referencing a new special block;

dividing said new special block into a memory block of a size to accommodate said memory block requested; and allocating said memory block of a size to accommodate said memory block requested.

7. The method as set forth in claim 1, further comprising the steps of:

apportioning a memory block for a large allocation if a memory block located is large enough for division into two large allocation memory blocks; and generating, for an apportioned memory block, a double linked pointer to identify physically adjacent blocks and a virtual page for each divided memory block portion.

8. The method as set forth in claim 7, further comprising the steps of:

merging, if possible, adjacent and available memory blocks through use of said double linked pointers to generate a new large block;

referencing said new large block from a new slot; and merging, if possible, adjacent and available memory blocks that constitute a virtual page of memory through use of said double linked pointers to free said virtual page of memory.

9. The method as set forth in claim 1, further comprising the steps of:

generating a plurality of pointers to identify one or more virtual pages of memory;

requesting a virtual page of memory if no memory blocks are available as identified from said bit map index; and allocating, if possible, a virtual page of memory identified from one of said pointers.

10. The method as set forth in claim 9, further comprising the step of generating a request to an operating system of said computer to obtain a virtual page of memory if a virtual page, as identified by said pointers, is not available.

11. A method for allocating memory in a computer system, said method comprising the steps of:

assigning portions of memory of equal size into one of a plurality of slots such that each slot includes zero or more memory blocks of equal size;

generating a plurality of free lists, one for each slot, such that each free list identifies memory blocks, corresponding to a slot size, not currently in use;

receiving a request, including a size, for a memory block;

rounding up said size of said memory block requested to a nearest slot;

searching one or more of said free lists to identify an available memory block to accommodate said memory block requested; and assigning a memory block not in use to accommodate said memory block requested.

12. The method as set forth in claim 11, wherein the step of assigning portions of memory of equal size into one of a plurality of slots comprises the step of assigning memory of equal size into at least 32 slots.

13. A computer readable medium having a set of instructions stored therein, which when executed by a computer, causes the computer to perform the steps of:

assigning portions of memory of equal size into one of a plurality of slots such that each slot includes zero or more memory blocks of equal size;

generating a bit map index comprising a plurality of bit flags, wherein each bit flag corresponds to one of said slots and indicates availability of at least one memory block for a corresponding slot;

receiving a request, including a size, for a memory block;

searching for available memory in response to said request by examining one or more of said bit flags in said bit map index to identify an available memory block to accommodate said memory block requested; and assigning a memory block not in use to accommodate said memory block requested.

14. The computer readable medium as set forth in claim 13, wherein:

the instructions for generating a bit map index comprises instructions for generating a hierarchical bit map index including instructions for:

assigning said slots to a plurality of groups;

generating, for each group, a group bit map index comprising a plurality of bit flags, wherein each bit flag corresponds to one of said groups, and each bit flag indicates availability of at least one memory block in a corresponding group;

generating, for each slot, a slot bit map index comprising a plurality of bit flags, wherein each bit flag corresponds to one of said slots, and each bit flag indicates availability of at least one memory block in a corresponding slot;

instructions for searching by examining one or more of said bit flags comprises instructions for:

examining said group bit index to identify an available group of memory blocks that accommodate said memory block requested; and examining one or more slot bit map indexes based on said bit flags in said group bit index to identify an available memory block to accommodate said memory block requested.

15. The computer readable medium as set forth in claim 13, wherein the instructions for searching for available memory in response to said request comprises instructions for:

searching for an available memory block corresponding to said nearest slot rounded up for said memory block requested;

searching, if no memory block of size equal to said nearest slot rounded up for said memory block requested is available, for an available memory block corresponding to a next largest slot; and searching, if no memory block in a prior slot searched is available, for an available memory block from a slot corresponding to a next largest slot until either an available block is located or until a largest slot has been searched.

16. The computer readable medium as set forth in claim 13, wherein the instructions for assigning portions of memory of equal size into one of a plurality of slots comprises instructions for:

assigning said memory into a plurality of slots, in increments of a first size, for small block allocations, wherein small block allocations include allocations of memory blocks smaller than a predefined maximum small block size; and assigning said memory into a plurality of slots, in increments of a second size, for large block allocations, wherein large block allocations include allocations of memory blocks smaller than a predefined maximum large block size and greater than said predefined maximum small block size.

17. The computer readable medium as set forth in claim 13, further comprising instructions for:

referencing a special block; and apportioning said special block into a memory block of a size to accommodate said memory block requested if, as identified by said bit map index, a memory block is not available and if said special block is large enough to accommodate said memory block requested.

18. The computer readable medium as set forth in claim 17, further comprising instructions for:

discarding, as a reference, said special block if said special block is not large enough to accommodate said memory block requested;

referencing a new special block;

dividing said new special block into a memory block of a size to accommodate said memory block requested; and allocating said memory block of a size to accommodate said memory block requested.

19. The computer readable medium as set forth in claim 13, further comprising instructions for:

apportioning a memory block for a large allocation if a memory block located is large enough for division into two large allocation memory blocks; and generating, for an apportioned memory block, a double linked pointer to identify physically adjacent blocks and a virtual page for each divided memory block portion.

20. The computer readable medium as set forth in claim 19, further comprising instructions for:

merging, if possible, adjacent and available memory blocks through use of said double linked pointers to generate a new large block;

referencing said new large block from a new slot; and merging, if possible, adjacent and available memory blocks that constitute a virtual page of memory through use of said double linked pointers to free said virtual page of memory.

21. A computer system comprising:

a central processing unit;

system memory;

a software program resident in said memory and executed by said central processing unit, for a request, including a size, for a memory block; and a dynamic memory allocator for assigning portions of memory of equal size into one of a plurality of slots such that each slot includes zero or more memory blocks of equal size, said dynamic memory allocator for generating a bit map index comprising a plurality of bit flags, wherein each bit flag corresponds to one of said slots and indicates availability of at least one memory block for a corresponding slot, for searching for available memory in response to said request by examining one or more of said bit flags in said bit map index to identify an available memory block to accommodate said memory block request, and for assigning a memory block not in use to accommodate said memory block requested.

* * * * *